(12) United States Patent
Wilkey et al.

(10) Patent No.: US 7,193,014 B2
(45) Date of Patent: *Mar. 20, 2007

(54) BINARY AND TERNARY BLENDS COMPRISING MONOVINYLARENE/CONJUGATED DIENE BLOCK COPOLYMERS AND MONOVINYLARENE/ALKYL (METH)ACRYLATE COPOLYMERS

(75) Inventors: John D. Wilkey, Owasso, OK (US); Carleton E. Stouffer, Bartlesville, OK (US); Vergil H. Rhodes, Bartlesville, OK (US); Jay M. Chaffin, Bartlesville, OK (US); John M. Brown, Bartlesville, OK (US); David Hartsock, Bartlesville, OK (US); James A. Keane, Woodlands, TX (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/784,143

(22) Filed: Feb. 20, 2004

(65) Prior Publication Data

US 2005/0187344 A1 Aug. 25, 2005

(51) Int. Cl.
*C08L 53/02* (2006.01)
(52) U.S. Cl. ............... 525/93; 525/98; 525/99
(58) Field of Classification Search ............... 525/98, 525/99, 93
See application file for complete search history.

(56) References Cited

U.S. PATENT DOCUMENTS

| | | | |
|---|---|---|---|
| 4,323,606 A | 4/1982 | Buck | 428/35 |
| 4,386,125 A | 5/1983 | Shiraki et al. | 428/36 |
| 4,386,190 A | 5/1983 | Bailey | 525/93 |
| 4,628,073 A | 12/1986 | Fisher | 525/70 |
| 5,134,199 A | 7/1992 | Hattori et al. | 525/314 |
| 5,223,577 A | 6/1993 | Baumgartner et al. | 525/149 |
| 5,466,499 A | 11/1995 | Takagi et al. | 428/36.9 |
| 5,510,423 A | 4/1996 | Van Dijk et al. | 525/316 |
| 5,587,425 A | 12/1996 | Moczygemba et al. | 525/98 |
| 5,628,950 A * | 5/1997 | Schrenk et al. | 264/241 |
| 5,753,326 A | 5/1998 | Blackwelder | 428/34.9 |
| 5,756,577 A | 5/1998 | Gutierrez-Villarreal | 525/88 |
| 6,096,828 A | 8/2000 | DePorter et al. | 525/98 |
| 6,107,411 A | 8/2000 | Toya et al. | 525/316 |
| 6,265,484 B1 | 7/2001 | Trepka et al. | 525/98 |
| 6,265,485 B1 | 7/2001 | Trepka et al. | 525/98 |
| 6,270,866 B1 | 8/2001 | Okuda et al. | 428/35.1 |
| 6,413,596 B1 | 7/2002 | Okuda et al. | 428/34.7 |
| 6,495,643 B1 | 12/2002 | Evans et al. | 526/256 |
| 6,660,790 B1 | 12/2003 | Hoshi et al. | 524/291 |
| 2003/0004267 A1* | 1/2003 | Swisher et al. | 525/98 |
| 2003/0166774 A1 | 9/2003 | Hoshi et al. | 525/88 |
| 2003/0166776 A1 | 9/2003 | Wright et al. | 525/88 |
| 2005/0222331 A1* | 10/2005 | Hoshi et al. | 525/88 |

FOREIGN PATENT DOCUMENTS

| | | |
|---|---|---|
| JP | WO03/091303 | 11/2003 |
| WO | WO03/099925 | 12/2003 |

OTHER PUBLICATIONS

PCT/US2005/005438 Search Report (Apr. 28, 2005).

* cited by examiner

*Primary Examiner*—Jeffrey Mullis
(74) *Attorney, Agent, or Firm*—Raymund F. Eich; Dan Burke; David W. Dockter (57) ABSTRACT

We disclose compositions, comprising (i) from about 25 parts by weight to about 95 parts by weight of a monovinylarene-conjugated diene coupled block copolymer comprising at least one tapered block, having a blocky monovinylarene content of less than 90 wt % of total monovinylarene units, and comprising a terminal monovinylarene block having a molecular weight of less than 60,000 g/mol; and (ii) from about 5 parts by weight to about 75 parts by weight of a monovinylarene-alkyl(meth)acrylate copolymer, comprising (ii-a) monovinylarene units and (ii-b) either alkyl acrylate units, alkyl methacrylate units, or both. The compositions can be used in shrink film or rigid packaging applications.

37 Claims, 6 Drawing Sheets

BINARY AND TERNARY BLENDS COMPRISING MONOVINYLARENE/CONJUGATED DIENE BLOCK COPOLYMERS AND MONOVINYLARENE/ALKYL (METH)ACRYLATE COPOLYMERS

BACKGROUND OF THE INVENTION

The present invention relates generally to the field of monovinylarene-conjugated diene block copolymers. More particularly, it concerns blends of such copolymers with other monovinylarene-containing polymers.

Thermally-formed packaging articles include categories that may be referred to herein as thermoformed packaging articles and shrink labels. Thermoformed packaging articles, for example, so-called clamshell packages and blister packs, are well known for packaging relatively small, relatively light articles, especially those for which it is desired to allow a consumer to visually inspect the article prior to purchase. Examples of packaged products include, but are not limited to, portable electronic devices (such as personal music players, telephone accessories, handheld electronic games, computer accessories, and game console accessories, among others), prepackaged foods (such as pudding cups, among others), and medical supplies, among others. To allow visual inspection and consumer handling of thermoformed packaging articles, such articles are generally made from materials having both high clarity and high toughness.

Shrink labels are known for use in labeling preformed packages or sealing the closures of preformed packages. Examples of such uses of shrink labels include, but are not limited to, labels on contoured bottles of beverages and containers of prepackaged foods and tamper-evident seals over the caps of pharmaceutical bottles, among others.

Two materials frequently used in thermally-formed packages are polyvinylchloride (PVC) and glycol-modified polyethylene terephthalate glycol (PETG). PETG is generally considered to have a relatively low glass transition temperature and a relatively high shrinkage upon exposure to heat, and as a result has been frequently used in shrink film applications. However, PETG is relatively expensive and has low melt strength, low heat deflection temperature, a tendency to absorb moisture, and relatively high specific gravity. Polyvinyl chloride (PVC) is relatively inexpensive, and has been used in thermally-formed packaging applications, but its poorer shrink performance (in shrink film applications), relatively high specific gravity, formation of corrosive and hazardous gases during extrusion, and a negative public perception of both several plasticizers often used to soften PVC and several of its incineration products render it less desirable.

Styrenic polymers, including styrene-butadiene copolymers, do not have these disadvantages. However, it remains challenging to produce thermally-formed packaging articles containing styrene-butadiene copolymers which have clarity, toughness, and shrink properties competitive with PVC or PETG.

SUMMARY OF THE INVENTION

In one embodiment, the present invention relates to a composition, comprising (i) from about 25 parts by weight to about 95 parts by weight of a monovinylarene-conjugated diene coupled block copolymer comprising at least one tapered block, having a blocky monovinylarene content of less than 90 wt % of total monovinylarene units, and comprising a terminal monovinylarene block having a molecular weight of less than 60,000 g/mol; and (ii) from about 5 parts by weight to about 75 parts by weight of a monovinylarene-alkyl(meth)acrylate copolymer, comprising (ii-a) monovinylarene units and (ii-b) either alkyl acrylate units, alkyl methacrylate units, or both.

In other embodiments, the present invention relates to shrink films and rigid packaging, each comprising a layer comprising the composition described above.

In other embodiments, the present invention relates to methods of packaging products by use of the shrink films or rigid packaging described above.

We report styrene-butadiene copolymers which have clarity, toughness, and shrink properties competitive with PVC or PETG and their use in thermally-formed packaging article applications for which PVC or PETG have been used.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

In one embodiment, the present invention relates to a composition, comprising:
 (i) from about 25 parts by weight to about 95 parts by weight of a monovinylarene-conjugated diene coupled block copolymer comprising at least one tapered block, having a blocky monovinylarene content of less than 90 wt % of total monovinylarene units, and comprising a terminal monovinylarene block having a molecular weight of less than 60,000 g/mol; and
 (ii) from about 5 parts by weight to about 75 parts by weight of a monovinylarene-alkyl(meth)acrylate copolymer, comprising (ii-a) monovinylarene units and (ii-b) either alkyl acrylate units, alkyl methacrylate units, or both.

Unless specified to the contrary or apparent from the plain meaning of a phrase, the word "or" has the inclusive meaning. The adjectives "first," "second," and so forth are not to be construed as limiting the modified subjects to a particular order in time, space, or both, unless specified to the contrary. A "copolymer" is used herein to refer to any polymer comprising at least two types of units, e.g., two types of units, three types of units, etc.

The composition comprises a blend of the two polymers, as will be discussed in more detail below. Any physical form of the blend is a composition, as the term is used herein. By way of example only, the composition can be in the form of a melt, pellets, a solution of the polymers in a solvent, one or more layers in a single-layer or multi-layer film, or one or more layers in a single-layer or multi-layer formed structure (such as a clamshell package, a blister pack, a thermoformed tray, or a shrink label, among others), among others.

The basic starting materials and polymerization conditions for preparing monovinylarene-conjugated diene block copolymers are disclosed in, e.g., U.S. Pat. Nos. 4,091,053; 4,584,346; 4,704,434; 4,704,435; 5,130,377; 5,227,419; 6,265,484; 6,265,485; 6,420,486; and 6,444,755, which are hereby incorporated herein by reference. The techniques taught therein are generally applicable to the preparation of the monovinylarene-conjugated diene rubbers discussed below.

"Monovinylarene," as used herein, refers to an organic compound containing a single carbon-carbon double bond, at least one aromatic moiety, and a total of 8 to 18 carbon atoms, such as 8 to 12 carbon atoms. Exemplary monovinylarenes include, but are not limited to, styrene, alpha-methylstyrene, 2-methylstyrene, 3-methylstyrene, 4-methylstyrene, 2-ethylstyrene, 3-ethylstyrene, 4-ethylstyrene, 4-n-propylstyrene, 4-t-butylstyrene, 2,4-dimethylstyrene, 4-cyclohexylstyrene, 4-decylstyrene, 2-ethyl-4-benzylstyrene, 4-(4-phenyl-n-butyl)styrene, 1-vinylnaphthalene, 2-vinylnaphthalene, and mixtures thereof. In one embodiment, the monovinylarene is styrene. A unit of polymer, wherein the unit is derived from polymerization of a monovinylarene monomer, is a "monovinylarene unit."

"Conjugated diene," as used herein, refers to an organic compound containing conjugated carbon-carbon double bonds and a total of 4 to 12 carbon atoms, such as 4 to 8 carbon atoms. Exemplary conjugated dienes include, but are not limited to, 1,3-butadiene, 2-methyl-1,3-butadiene, 2-ethyl-1,3-butadiene, 2,3-dimethyl-1,3-butadiene, 1,3-pentadiene, 3-butyl-1,3-octadiene, and mixtures thereof. In one embodiment, the conjugated diene can be 1,3-butadiene or isoprene. A unit of polymer, wherein the unit is derived from polymerization of a conjugate diene monomer, is a "conjugated diene unit."

A "monovinylarene-conjugated diene block copolymer" is a polymer comprising monovinylarene units and conjugated diene units. The polymer comprises one or more blocks, wherein each block comprises monovinylarene units or conjugated diene units. Any particular block can comprise either or both monovinylarene units or conjugated diene units. If it comprises only one type of units, it can be termed a "monoblock." If it comprises both, it can be a random block, a tapered block, a stepwise block, or any other type of block. In the present invention, "monovinylarene-conjugated diene block copolymer" does not include monovinylarene-conjugated diene rubbers, as defined below.

A block is "random" when the mole fractions of conjugated diene units and monovinylarene units in a section of the block are substantially the same as the mole fractions of conjugated diene units and monovinylarene units in the entire block. This does not preclude the possibility of sections of the block having regularity (i.e., appearing non-random), but such regular sections will typically be present at no more than about the level expected by chance.

A block is "tapered" when both (a) the mole fraction of conjugated diene units in a first section of the block is higher than the mole fraction of conjugated diene units in a second section of the block, wherein the second section of the block is closer to a given end of the block and (b) condition (a) is true for substantially all sections of the block. (Depending on the size of the sections being considered, condition (a) may not be true for all sections, but if so, will be not true at no more than about the level expected by chance).

A block is "stepwise" when a first section of the block contains substantially all monovinylarene units of the block and a second section of the block contains substantially all conjugated diene units of the block. In light of the above definition, the first section is not necessarily prior to the second section in time, space, or any other parameter.

In one embodiment, the monovinylarene-conjugated diene copolymer is a block copolymer comprising styrene blocks and butadiene blocks (a "styrene-butadiene copolymer"). An exemplary styrene-butadiene copolymer is commercially available under the name K-Resin® SBC (Chevron Phillips Chemical Co., The Woodlands, Tex.).

Generally, each block is formed by polymerizing the monomer or mixture of monomers from which the desired units of the block are derived. The polymerization process will generally be amenable to a relative lack of change in process parameters between different blocks, but the skilled artisan, having the benefit of the present disclosure, may make some minor changes in process parameters between different blocks as a matter of routine experimentation. The following descriptions of the polymerization process will generally apply to the formation of all types of blocks in the inventive polymer, although certain descriptions may be of more or less value to forming one or more of the types of blocks in the inventive polymer.

The polymerization process can be carried out in a hydrocarbon diluent at any suitable temperature in the range of from about −100° C. to about 150° C., such as from about 0° C. to about 150° C., and at a pressure sufficient to maintain the reaction mixture substantially in the liquid phase. In one embodiment, the hydrocarbon diluent can be a linear or cyclic paraffin, or mixtures thereof. Exemplary linear or cyclic paraffins include, but are not limited to, pentane, hexane, octane, cyclopentane, cyclohexane, and mixtures thereof, among others. In one embodiment, the paraffin is cyclohexane.

The polymerization process can be carried out in the substantial absence of oxygen and water, such as under an inert gas atmosphere.

The polymerization process can be performed in the presence of an initiator. In one embodiment, the initiator can be any organomonoalkali metal compound known for use as an initiator. In a further embodiment, the initiator can have the formula RM, wherein R is an alkyl, cycloalkyl, or aryl radical containing 4 to 8 carbon atoms, such as an n-butyl radical, and M is an alkali metal, such as lithium. In a particular embodiment, the initiator is n-butyl lithium.

The amount of initiator employed depends upon the desired polymer or block molecular weight, as is known in the art and is readily determinable, making due allowance for traces of reaction poisons in the feed streams.

The polymerization process can further involve the inclusion of small amounts of randomizers. In one embodiment, the randomizer can be a polar organic compound, such as an ether, a thioether, or a tertiary amine. In another embodiment, the randomizer can be a potassium salt or a sodium salt of an alcohol. The randomizer can be included in the hydrocarbon diluent to improve the effectiveness of the initiator, to randomize at least part of the monovinylarene monomer in a mixed monomer charge, or both. The inclusion of a randomizer can be of value when forming a random or tapered monovinylarene-conjugated diene block of the present polymer.

Exemplary randomizers include, but are not limited to, dimethyl ether, diethyl ether, ethyl methyl ether, ethyl propyl ether, di-n-propyl ether, di-n-octyl ether, anisole, dioxane, 1,2-dimethoxyethane, dibenzyl ether, diphenyl ether, 1,2-dimethoxybenzene, tetrahydrofuran, potassium tert-amylate, dimethyl sulfide, diethyl sulfide, di-n-propyl sulfide, di-n-butyl sulfide, methyl ethyl sulfide, dimethylethylamine, tri-n-ethylamine, tri-n-propylamine, tri-n-butylamine, trimethylanine, triethylamine, tetramethylethylenediamine, tetraethylethylenediamine, N,N-di-methylaniline, N-methyl-N-ethylaniline, N-methylmorpholine, and mixtures thereof, among others.

When forming a particular block, each monomer charge or monomer mixture charge can be polymerized under solution polymerization conditions such that the polymerization of each monomer charge or monomer mixture charge, to form the particular block, is substantially complete before charging a subsequent charge. "Charging," as used herein, refers to the introduction of a compound to a reaction zone, such as the interior of a reactor vessel.

Though not to be bound by theory, if an initiator is included in a charge, a block will typically form either de novo or by addition to the end of an unterminated, previously-formed, block. Further not to be bound by theory, if an initiator is not included in a charge, a block will typically only form by addition to the end of an unterminated, previously-formed, block.

A coupling agent can be added after polymerization is complete. Suitable coupling agents include, but are not limited to, di- or multivinylarene compounds; di- or multiepoxides; di- or multiisocyanates; di- or multialkoxysilanes; di- or multiimines; di- or multialdehydes; di- or multiketones; alkoxytin compounds; di- or multihalides, such as silicon halides and halosilanes; mono-, di-, or multianhydrides; di- or multiesters, such as the esters of monoalcohols with polycarboxylic acids; diesters which are esters of monohydric alcohols with dicarboxylic acids; diesters which are esters of monobasic acids with polyalcohols such as glycerol; and mixtures of two or more such compounds, among others.

Useful multifunctional coupling agents include, but are not limited to, epoxidized vegetable oils such as epoxidized soybean oil, epoxidized linseed oil, and mixtures thereof, among others. In one embodiment, the coupling agent is epoxidized soybean oil. Epoxidized vegetable oils are commercially available under the tradename Vikoflex™ from Atofina Chemicals (Philadelphia, Pa.).

If coupling is to be performed, any effective amount of the coupling agent can be employed. In one embodiment, a stoichiometric amount of the coupling agent relative to active polymer alkali metal tends to promote maximum coupling. However, more or less than stoichiometric amounts can be used for varying coupling efficiency where desired for particular products.

Following completion of the coupling reaction, if any, the polymerization reaction mixture can be treated with a terminating agent such as water, carbon dioxide, alcohol, phenols, or linear saturated aliphatic mono-dicarboxylic acids, to remove alkali metal from the block copolymer or for color control.

After termination, if any, the polymer cement (polymer in polymerization solvent) usually contains about 10 to 40 weight percent solids, more usually 20 to 35 weight percent solids. The polymer cement can be flashed to evaporate a portion of the solvent so as to increase the solids content to a concentration of about 50 to about 99 weight percent solids, followed by vacuum oven or devolatilizing extruder drying to remove the remaining solvent.

The block copolymer can be recovered and worked into a desired shape, such as by milling, extrusion, or injection molding. The block copolymer can also contain additives such as antioxidants, antiblocking agents, release agents, fillers, extenders, and dyes, and the like.

In the present invention, the monovinylarene-conjugated diene block copolymer can be polymodal, that is, a population of block copolymer molecules can have two or more peaks in a histogram of the population's molecular weight distribution, or it can be monomodal, that is, a population of block copolymer molecules can have one peak in a histogram of the population's molecular weight distribution. In one embodiment, the monovinylarene-conjugated diene block copolymer can be polymodal, such as bimodal (having two peaks in the molecular weight distribution histogram).

In the present invention, the monovinylarene-conjugated diene block copolymer can be coupled, as described above.

In the present invention, the monovinylarene-conjugated diene block copolymer can have at least one tapered block. In one embodiment, the monovinylarene-conjugated diene block copolymer has from 1 to 3 tapered blocks, inclusive. In another embodiment, the monovinylarene-conjugated diene block copolymer comprises two or three tapered blocks. In one embodiment, the monovinylarene-conjugated diene block copolymer comprises two tapered blocks which are adjacent (i.e., directly bonded to each other).

The monovinylarene-conjugated diene block copolymer can have a blocky monovinylarene content of less than about 90 wt %. The blocky monovinylarene content is defined as the weight of monovinylarene units whose two nearest neighbors on the polymer chain are both monovinylarene units, divided by the total weight of monovinylarene units in the copolymer, with the quotient expressed as a percentage. The blocky monovinylarene content can be measured by H-1 NMR, as described in more detail in the Examples.

In one embodiment, the monovinylarene-conjugated diene block copolymer comprises a terminal monovinylarene block having a molecular weight of less than 60,000 g/mol. A terminal block is a block resident at an end of a polymer chain. In one embodiment, the terminal block can be the temporally-first block prepared during polymerization of the monovinylarene-conjugated diene block copolymer, i.e., the block formed as a result of the temporally-first charge to the reaction vessel. In one embodiment, the monovinylarene-conjugated diene block copolymer comprises two terminal monovinylarene blocks.

As stated above, the composition can comprise from about 25 parts by weight to about 95 parts by weight of the monovinylarene-conjugated diene block copolymer. In one embodiment, the composition can comprise from about 30 parts by weight to about 80 parts by weight of the monovinylarene-conjugated diene block copolymer. In one embodiment, the composition can comprise from about 35 parts by weight to about 75 parts by weight of the monovinylarene-conjugated diene block copolymer. In one embodiment, the composition can comprise from about 40 parts by weight to about 70 parts by weight of the monovinylarene-conjugated diene block copolymer. In a further embodiment, the composition can comprise from about 45 parts by weight to about 65 parts by weight. In one embodiment, the composition can comprise from about 70 parts by weight to about 90 parts by weight.

The monovinylarene-conjugated diene block copolymer can comprise from about 20 wt % to about 30 wt % conjugated diene units. If the copolymer contains only monovinylarene and conjugated diene units, it can comprise from about 70 wt % to about 90 wt % monovinylarene units. In one embodiment, the monovinylarene-conjugated diene block copolymer can comprise from about 75 wt % to about 80 wt % monovinylarene units. In another embodiment, the monovinylarene-conjugated diene block copolymer can comprise from about 70 wt % to about 75 wt % monovinylarene units. In still another embodiment, the monovinylarene-conjugated diene block copolymer can comprise from about 80 wt % to about 85 wt % monovinylarene units.

The monovinylarene-conjugated diene block copolymer can further comprise other units known in the art for inclusion in monovinylarene-conjugated diene block copolymers.

The composition also comprises a monovinylarene-alkyl(meth)acrylate copolymer, by which is meant a polymer comprising (ii-a) monovinylarene units and (ii-b) either alkyl acrylate units, alkyl methacrylate units, or both.

The monovinylarene units of the monovinylarene-alkyl(meth)acrylate copolymer are as described above. In one embodiment, the monovinylarene units are styrene units.

The alkyl acrylate units or alkyl methacrylate units can be incorporated into the monovinylarene-alkyl(meth)acrylate copolymer by free radical polymerization (such as processes comprising the use of free-radical generating peroxide catalysts such as benzoyl peroxide, acetyl peroxide, or di-t-butyl peroxide, among others, at temperatures generally lower than those described above), although this is not limiting and use of other polymerization techniques can be a matter of routine experimentation for the skilled artisan having the benefit of the present disclosure.

A unit derived from polymerization of an alkyl acrylate is an "alkyl acrylate unit," and a unit derived from polymerization of an alkyl methacrylate is an "alkyl methacrylate unit."

An "alkyl acrylate" is an organic compound having the formula $CH_2=CHC(=O)OR$, wherein R is an organic moiety. In one embodiment, R can have from 1 to about 6 carbon atoms. In one embodiment, the alkyl acrylate units of the monovinylarene-alkyl(meth)acrylate copolymer can be methyl acrylate units, ethyl acrylate units, propyl acrylate units, butyl acrylate units, pentyl acrylate units, or hexyl acrylate units.

In one embodiment, the monovinylarene-alkyl(meth)acrylate copolymer comprises from about 10 wt % to about 25 wt % butyl acrylate units. In one embodiment, the monovinylarene-alkyl(meth)acrylate copolymer comprises from about 10 wt % to about 17.5 wt % butyl acrylate units. In a further embodiment, the monovinylarene-alkyl (meth)acrylate copolymer comprises from about 17.5 wt % to about 25 wt % butyl acrylate units.

An "alkyl methacrylate" is an organic compound having the formula $CH_2=C(CH_3)C(=O)OR$, wherein R is an organic moiety. In one embodiment, R can have from 1 to about 6 carbon atoms. In one embodiment, the alkyl methacrylate units of the monovinylarene-alkyl(meth)acrylate copolymer can be methyl methacrylate units, ethyl methacrylate units, propyl methacrylate units, butyl methacrylate units, pentyl methacrylate units, or hexyl methacrylate units.

In one embodiment, the monovinylarene-alkyl(meth)acrylate copolymer comprises from about 3 wt % to about 10 wt % methyl methacrylate units.

In one embodiment, the monovinylarene-alkyl(meth)acrylate copolymer comprises styrene units, butyl acrylate units, and methyl methacrylate units. In a further embodiment, the monovinylarene-alkyl(meth)acrylate copolymer comprises from about 10 wt % to about 17.5 wt % butyl acrylate units, and the butyl acrylate units and the methyl methacrylate units together comprise from about 10 wt % to about 25 wt % of the copolymer.

The monovinylarene-alkyl(meth)acrylate copolymer can further comprise other units known in the art to be suitable for inclusion in such copolymers.

The monovinylarene-alkyl(meth)acrylate copolymer can be prepared by free radical polymerization, as described above, or by other techniques known to the skilled artisan. The monovinylarene-alkyl(meth)acrylate copolymer can be a block copolymer, and the blocks can be monoblocks, random blocks, tapered blocks, or stepwise blocks, as described above.

As stated above, the composition can comprise from about 5 parts by weight to about 75 parts by weight of the monovinylarene-alkyl(meth)acrylate copolymer. In one embodiment, the composition can comprise from about 10 parts by weight to about 70 parts by weight of the monovinylarene-alkyl(meth)acrylate copolymer. In a further embodiment, the composition can comprise from about 10 parts by weight to about 30 parts by weight of the monovinylarene-alkyl(meth)acrylate copolymer. In another further embodiment, the composition can comprise from about 24 parts by weight to about 65 parts by weight of the monovinylarene-alkyl(meth)acrylate copolymer.

The composition can comprise only the monovinylarene-conjugated diene block copolymer and the monovinylarene-alkyl(meth)acrylate copolymer, or it can further comprise other polymers.

In one embodiment, the composition further comprises from about 0.1 parts by weight to about 20 parts by weight of a monovinylarene-conjugated diene rubber. A monovinylarene-conjugated diene rubber differs from the monovinylarene-conjugated diene block copolymers described above in that the rubber comprises less than about 50 wt % monovinylarene units.

A monovinylarene-conjugated diene rubber can be prepared by the techniques described above.

In one embodiment, in the monovinylarene-conjugated diene rubber, the monovinylarene is styrene, and the conjugated diene is butadiene or isoprene.

The monovinylarene-conjugated diene rubber can further comprise other units known in the art to be suitable for inclusion in monovinylarene-conjugated diene rubbers.

In one embodiment, the composition can comprise from about 1 part by weight to about 20 parts by weight of the monovinylarene-conjugated diene rubber. In one embodiment, the composition can comprise from about 0.1 parts by weight to about 10 parts by weight of the monovinylarene-conjugated diene rubber. In a further embodiment, the composition can comprise from about 1 part by weight to about 10 parts by weight of the monovinylarene-conjugated diene rubber.

The polymers described above can be combined by any appropriate technique. In one embodiment, pellets of each polymer are combined by mechanical mixing prior to introduction of the mix into the plasticating screw of the converting equipment in use. One example of converting equipment is a sheet extruder. This mechanical mixing can be performed by stirring the polymer components, tumbling the components, simultaneous metering of the components, or by a combination of these techniques. The mechanical mixing can take place separate from or as an integral part of the feed hopper of the plasticating screw of the converting equipment.

In another embodiment, the individual polymers can be introduced into a compounding extruder to produce pellets, each of which contains some quantity of each of the individual polymers. These compounded pellets may then be introduced into the plasticating screw of the converting equipment in use. The compounding extruder melts the individual polymers and mixes them together in the molten state to produce pellets which are reasonably homogeneous in their blend composition. The individual polymers may be introduced into the compounding extruder through the feed hopper using the mechanical mixing techniques previously described, or by use of side feed extruders metering one or more of the melted components directly into the barrel of the compounding extruder.

In addition to the polymers described above, the composition can further comprise a solvent or solvents, one or more of various additives known in the art to be suitable for inclusion with such a composition, or the like, as a matter of routine experimentation for the ordinary skilled artisan.

In one embodiment, the present invention relates to a film, comprising a layer, comprising a composition as described above. "Film" is used herein to refer to any extruded material having a relatively thin structure and comprising the composition as a component of at least one layer of the film. The extruded material can be flexible or rigid, monolayer or multilayer, molded or unmolded, raw or processed into a structure suitable for end-use, or the like and be a film under this definition. Materials informally referred to in the industry as "sheets" are films under this definition.

In one embodiment, the film is a shrink film, that is, the film has been oriented in at least one direction.

A shrink film or shrink label, used interchangeably herein, is a film portion which will shrink in at least one direction upon exposure to heat. The terms "shrink film" or "shrink label" encompass such a film portion before, during, or after heat exposure and decrease in the length or the width. Before heat exposure, the shrink film can be referred to as an "unshrunk shrink film" while also being a shrink film according to the definition given above. The thickness of the shrink film can be any appropriate thickness, such as from about 0.1 mil to about 10 mil.

The shrink film can have any structure, such as a patch-like structure or a cylindrical structure. When the shrink film has a cylindrical structure, it can be termed a shrink sleeve.

Any geometry of the shrink film, in terms of size, shape, number of sides, radius, or the like, is contemplated, and will be matter of routine experimentation for the skilled artisan having the benefit of the present disclosure.

A film can be produced by any technique known in the art of monolayer and coextruded film making; and if the film is a shrink film, it can be oriented by any technique known in the art of uniaxial and biaxial orientation. A film can have a machine direction ("MD") (the direction in which the film comes off the production apparatus) and a transverse direction ("TD") (the direction perpendicular to the machine direction).

Generally, a shrink film oriented in the TD can be called a "sleeve label". In one embodiment, the sleeve label can be printed and slit in the MD direction. Solvent bonding can then be used to form a seam parallel to the TD and make a sleeve. The sleeve can be applied from the top of a container, resulting in the TD direction of the film around the circumference of the container. The materials making up a sleeve label can be chosen to have a desirable degree of shrinkage.

Generally, a shrink film oriented in the MD can be called a "roll fed" label. A roll fed label can be fed in the machine direction from a roll into a labeling machine. The labeling machine can wrap the roll fed label around a container, cut the roll fed label, and solvent bond the roll fed label, with the MD direction of the film around the circumference of the container.

Generally, a shrink film can be produced by sheet extrusion, followed by tentering; or blown or cast film techniques (with or without additional orientation steps). For example, a shrink film can be extruded on a sheet extrusion line to form a sheet. Molten polymer can flow from a flat die across the width of the line and onto a chill roll stack, which can cool the molten material. It can then be fed directly into an orienter or trimmed and wound onto a roll for later orientation. The sheet can be fed into a tentering frame for TD orientation, or an MD orienter, or both. Some tentering frames are capable of orienting the sheet in the MD and TD directions simultaneously. The finished film is typically about 0.2 times as thick as the extruded sheet, but this is an observation and not a statement limiting the present invention.

A shrink film can also be produced using conventional cast film extrusion techniques. In one embodiment of a cast process, molten material can flow from a flat die across the width of the line and onto a chilled drum, which can cool the molten material. It can then be trimmed and wound on a final drum into rolls of film. Typically, cast film has higher shrinkage in the machine direction than in the transverse direction, but this is solely an observation of typical films, and not a limiting description of the invention. Cast films can be oriented in the MD, TD, or both directions, as well. Commonly, orientation of cast films can be performed by film extrusion followed by tentering.

In a blown film process, the extrusion process upstream of the die can be similar to the cast process, but the die and downstream can be different. In an exemplary blown film process, the die can be annular (circular) and typically point upward. This can produce a cylindrical tube, which can be collapsed at the top, resulting in a flattened tube. In a "double bubble" process, the tube can be reinflated, reheated, stretched to introduce additional orientation, and recollapsed. A collapsed tube or recollapsed tube can have its edges removed and then be wound into separate rolls of film.

Multi-layer structures, produced by coextrusion, can be produced on sheet extrusion, blown film, or cast film equipment. In coextrusion, two or more polymers can be simultaneously extruded through one die. Two or more extruders can be used simultaneously to feed the die. In coextrusion, various polymer melts can be introduced into the die under conditions of laminar flow such that there is little intermixing, but bonding occurs at the interface between the film layers.

In another embodiment, the present invention relates to a method of applying a label to a container, comprising:
    shrinking (a) a shrink film, as described above, to (b) at least a portion of the exterior surface of a container structure.

The container structure can be any structure known in the art for use in storing or transporting a food, a beverage, or any other product. The container structure has an interior surface and an exterior surface, wherein at least a portion of the interior surface is in contact with the product and the exterior surface is generally in greater contact with the environment. The container structure also can have an opening allowing liquid, solid, or gas communication between the volume defined by the container structure and the environment. The opening can be closed with a cap, cork, lid, or other closing item. The portion of the closing item in contact with the environment can be considered as a component of the exterior surface of the container structure. Common container structures include, but are not limited to, bottles, cartons, cups, trays, bags, and boxes, among others. Common materials from which container structures can be fabricated include, but are not limited to, glass, paperboard, cardboard, polypropylene, polystyrene, and polyethylene terephthalate, among others.

The container structure can have any shape. In particular exemplary embodiments, it can have a substantially cylindrical body, a curved body, a cubic body, a parellelepipedal body, or a relatively amorphous body, among others. Any of the foregoing container structures, or any others, can have a neck or gable-top of any shape or size. Any of the foregoing container structures, or any others, can have an opening of any shape or size. The opening of any container structure can be closed with a cap, cork, lid, or other closing item of any shape, size, and closing means. Exemplary closing means include, but are not limited to, screw caps, corks, pull-tabs, or lids, among others.

Figure 1:
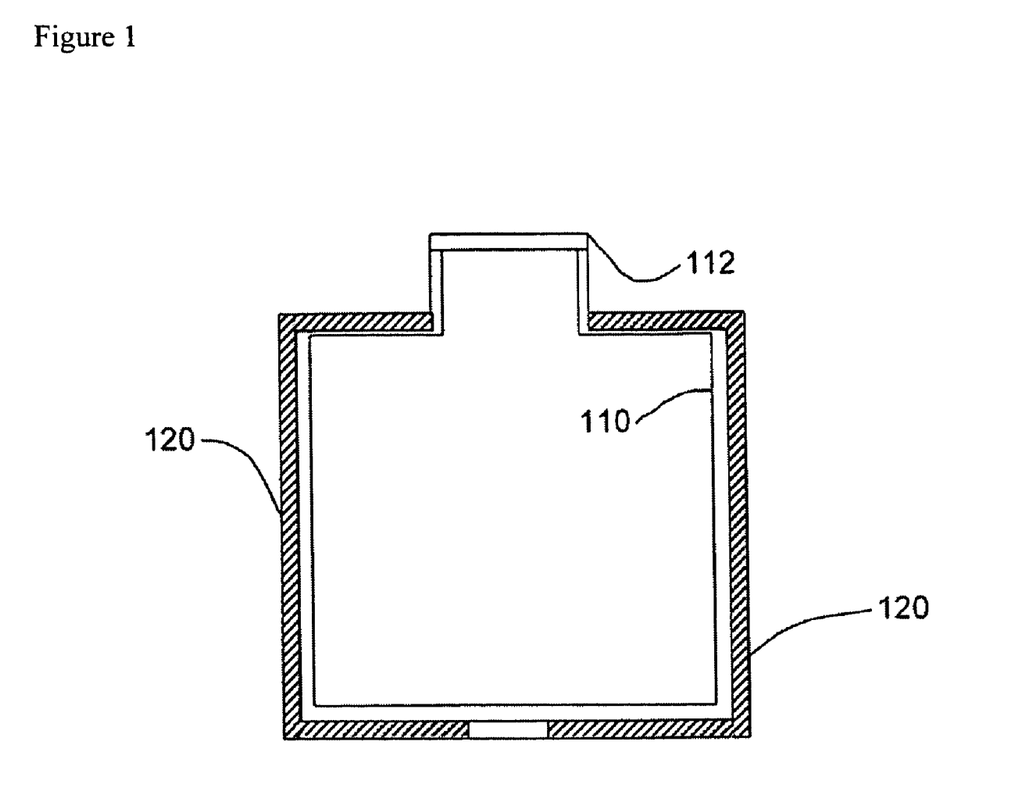
FIG. 1 presents a cross-sectional view of a container structure according to one embodiment of the present invention.

As stated above, the shrink label is in contact with at least a portion of the exterior surface of the container structure. In one embodiment, the portion of the exterior surface does not define the opening of the container structure. FIG. 1 shows a cross sectional view of an exemplary container structure according to this embodiment. The container structure 110 can be, e.g., a bottle formed from, e.g., polyethylene terephthalate. The opening can be sealed by a cap or other seal 112. The shrink label 120 can be in circumferential contact with the exterior of the container structure 110, including at least partial contact with the exterior of the base of the container structure 110.

Figure 2:
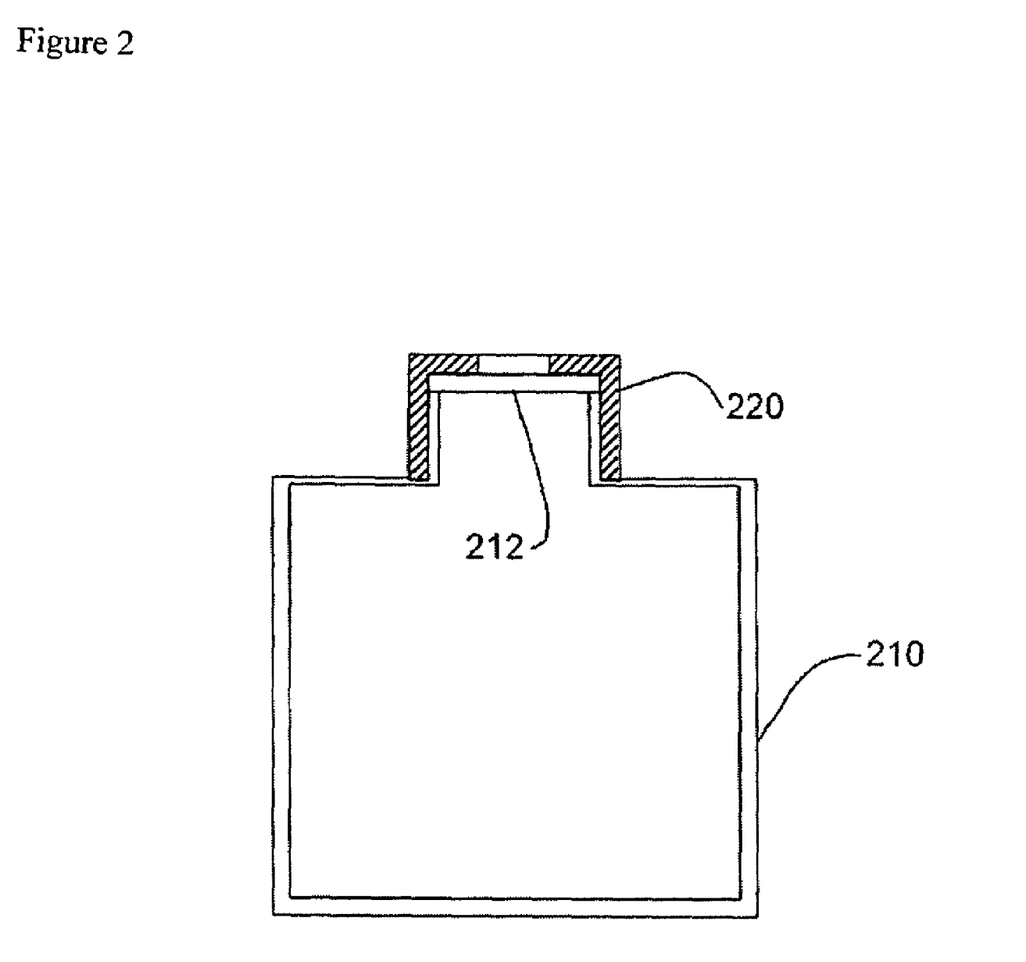
FIG. 2 presents a cross-sectional view of a container structure according to another embodiment of the present invention.

In another embodiment, the portion of the exterior surface defines the opening of the container structure. FIG. 2 shows a cross sectional view of an exemplary container structure according to this embodiment. The container structure 210 can be, e.g., a bottle formed from, e.g., polyethylene terephthalate. The opening can be sealed by a cap 212, and the shrink label 220 can be applied over at least a portion of the cap 212 and adjacent portions of the exterior of the container structure 210. The shrink label 220 can form a tamper-evident or safety seal, such as are known for use in packaging pharmaceutical products and the like, although this is merely one possible use and it will be clear to the skilled artisan that the invention is not limited thereto.

As a reminder, the embodiments shown in FIGS. 1–2 are exemplary, and the invention is not limited thereto. Specifically, other container structure body shapes, openings, and closing items, as well as other arrangements of the shrink label relative to the container structure, are within the scope of the claims.

The shrinking step involves positioning the unshrunk shrink label in proximity to the exterior surface of the container structure, followed by exposing the unshrunk shrink label to heat. The exposure to heat will lead to shrinking of the shrink label into contact with the exterior surface. Generally, the shrink film will shrink in the direction in which it was oriented; for example, if the shrink film was oriented by stretching in the machine direction, upon exposure to heat, it will shrink in the machine direction.

In one embodiment, positioning the unshrunk shrink label comprises wrapping the unshrunk shrink label around the container structure. This embodiment can be termed a "roll fed" embodiment.

In another embodiment, positioning the unshrunk shrink label comprises creating a sleeve from the unshrunk shrink label and sliding the sleeve over the container structure. This embodiment can be termed a "shrink sleeve" embodiment.

Figure 3:
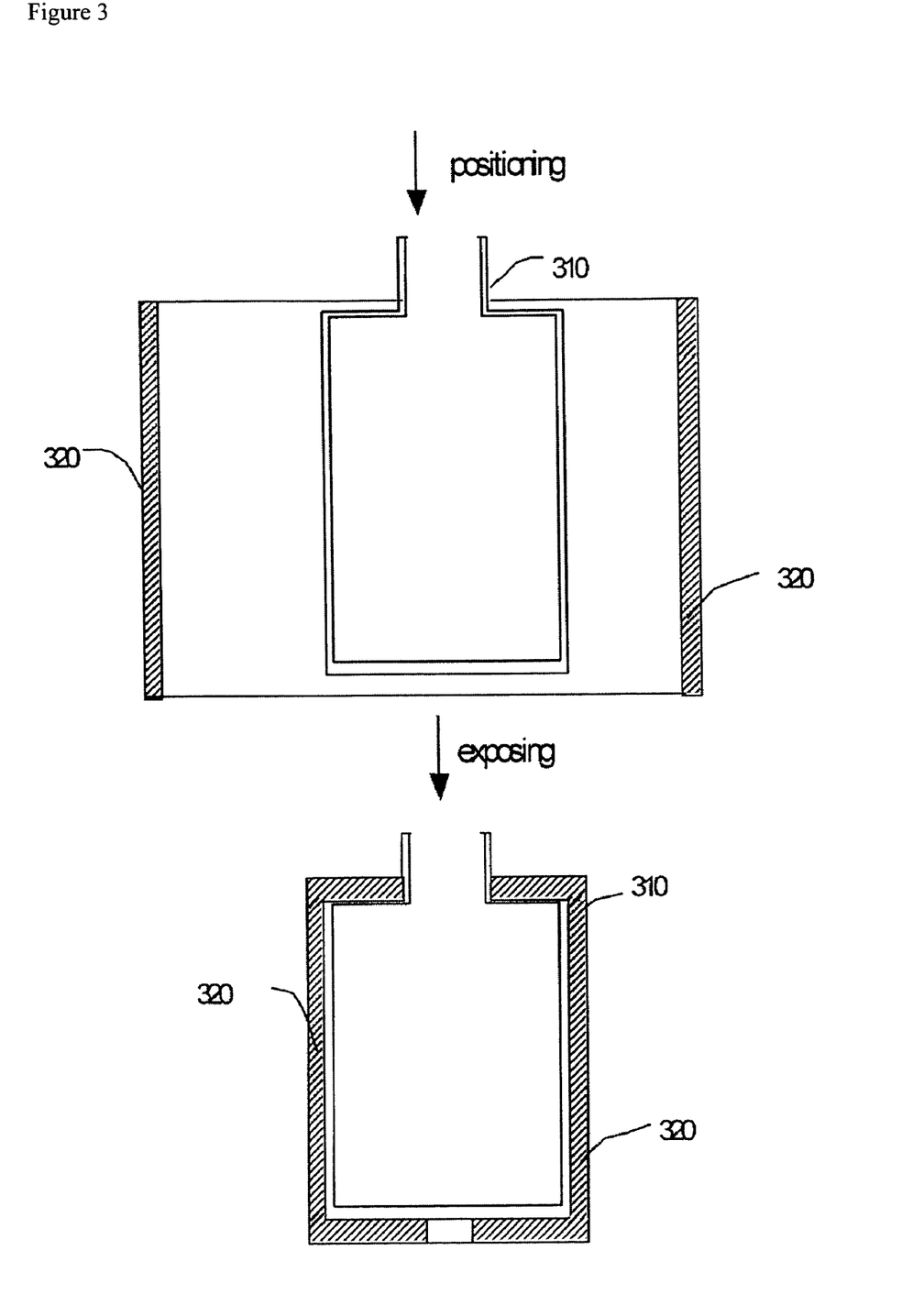
FIG. 3 presents a cross-sectional view of a container structure and shrink sleeve according to one method contemplated by the present invention.

An example of the "shrink sleeve" embodiment is shown in FIG. 3. As shown in cross section, an unshrunk sleeve 320 is positioned around a container structure 310, to yield the arrangement shown in the upper portion of FIG. 3. After exposing to heat, the shrink sleeve 320 is shrunk to contact at least a portion of the exterior surface of the container structure 310. This embodiment is merely exemplary. Any portion of the exterior surface of the container structure can be contacted by the shrink sleeve after shrinking; the portion may, but need not, encompass any one or more of the bottom, the sides, the neck, or the cap or other closing item, among others.

Any temperature which can lead to shrinking of the shrink label can be used in the shrinking step. In one embodiment, the temperature is less than about 150° C. In a further embodiment, the temperature is less than about 100° C. In yet a further embodiment, the temperature is less than about 80° C.

The result of the shrinking step is the container structure with a shrink label adhered to its exterior surface.

In another embodiment, the present invention relates to a packaging article, comprising a layer, comprising a composition as described above.

Any packaging article which can comprise the composition is within the scope of "packaging article", as used herein. In one embodiment, the packaging article is in the form of a thermoformed package. Exemplary thermoformed packages include, but are not limited to, those loosely referred to as "clamshell packages," "lidded trays," or "blister packs." A typical clamshell package is a closable package consisting of a rigid top and rigid bottom. The top may be hinged to the bottom using a living hinge or a mechanical hinge, or the top may be a separate piece. The clamshell may be held in the closed position by welding, bonding, or mechanical means. The clamshell may be used for packaging a variety of products including, but not limited to consumer, industrial, medical, or food products. A typical lidded tray consists of a rigid tray covered by a flexible lid. The flexible lid may or may not be bonded or sealed to the tray. Lidded trays may be used for packaging a variety of products including, but not limited to consumer, industrial, medical, or food products. A typical blister pack consists of a rigid backing bonded or mechanically attached to a thermoformed plastic blister. Blister packs may be used for packing a variety of products including, but not limited to consumer, industrial, medical, or food products. Many other thermoformed packages can exist which are not readily classifiable into one of the terms given above.

Typically, the wall of the thermoformed packaging article of this embodiment is both thicker than a shrink film prepared from a similar composition and not oriented, save by incidental orientation occurring as a result of the sheet extrusion or package formation process, described in more detail below. However, this is merely a general observation, not a limitation of the present invention.

In another embodiment, the present invention relates to a method of packaging a product, comprising:
  forming a layer comprising the composition as described above into a packaging article structured to receive the product; and
  sealing the product into the packaging article.

Forming the composition into the packaging article can be performed by any technique known in the art. In one embodiment, the composition is provided as pellets, which can be melted to form a melt, and the melt can then be extruded to yield a film. The film can then be molded, according to the product for which packaging is desired, to yield a packaging article, such as a clamshell package or a blister pack, structured to receive the product. Structuring the packaging article to receive the product is a routine matter for the skilled artisan having the benefit of the present disclosure. The structure will vary depending on the product to be packaged, the type of the packaging article, and the like.

Sealing the product into the packaging article can be performed by any technique, depending on the product and the packaging article, among other parameters. In a clamshell package, the product generally can be fit into the portion of the receiving structure in one half of the package; the other half of the package is closed around the product; and the package is sealed by heating, welding, solvent bonding, adhesive bonding, mechanical sealing such as stapling, or other techniques known in the art, or a combination of two or more of the foregoing. If the packaging article is a blister pack, the structure for receiving the product typically comprises a portion of the blister pack. In a blister pack, the product is generally fit between the blister pack and the rigid backing (the latter commonly being cardboard or paperboard, although other materials can be used in blister backings), and the package is sealed, such as by the techniques referred to above for sealing a clamshell package.

The following examples are included to demonstrate specific embodiments of the invention. It should be appreciated by those of skill in the art that the techniques disclosed in the examples which follow represent techniques discovered by the inventor to function well in the practice of the invention. However, those of skill in the art should, in light of the present disclosure, appreciate that many changes can be made in the specific embodiments which are disclosed and still obtain a like or similar result without departing from the spirit and scope of the invention.

Materials and Methods

Blocky monovinylarene content (or monovinylarene blockiness), as stated above, is the proportion of the monovinylarene units of a polymer whose two nearest neighbors in the polymer chain are both monovinylarene units. The monovinylarene blockiness is determined after using H-1 NMR to measure two experimental quantities as follows.

First, the total number of monovinylarene units (i.e. arbitrary instrument units which cancel out when ratioed) is determined by integrating the total monovinylarene aromatic signal in the H-1 NMR spectrum from 7.5 to 6.2 ppm and dividing this quantity by x, wherein x is the number of hydrogen atoms on the arene ring.

Second, the blocky monovinylarene units are determined by integrating that portion of the aromatic signal in the H-1 NMR spectrum from the signal minimum between 6.88 and 6.80 to 6.2 ppm and dividing this quantity by, e.g., 2 to account for the 2 ortho hydrogens on each blocky styrene aromatic ring (or other divisor, routinely determined by the skilled artisan and depending on the monovinylarene units known to be in the polymer). The assignment of this signal to the two ortho hydrogens on the rings of those styrene units which have two styrene nearest neighbors was reported in F. A. Bovey, High Resolution NMR of Macromolecules (Academic Press, New York and London, 1972), chapter 6. The monovinylarene blockiness is simply the percentage of blocky monovinylarene to total monovinylarene units:

Blocky %=100*(Blocky Monovinylarene Units/Total Monovinylarene Units)

Quantities of reagents are expressed in parts per hundred monomer (phm) based on the total weight of monovinylarene and conjugated diene employed. Peak molecular weights were determined by Gel Permeation Chromatography from a conventional calibration curve generated with commercial polystyrene standards. Tetrahydrofuran was used as eluent at room temperature.

EXAMPLES 1–5

Styrene and 1,3-butadiene were dried by passage over activated alumina. Styrene/butadiene block copolymers were prepared employing a sequential solution polymerization. Polymerization runs were carried out under nitrogen in a stirred, jacketed, stainless steel 2.5-gallon reactor employing essentially anhydrous reactants and conditions. The anhydrous mixtures were stirred continuously during the polymerization process. About 75% of the total amount of cyclohexane solvent was charged initially. The remaining cyclohexane was added during the run as a diluent or flush for the various reactants added in subsequent steps. The cyclohexane was preheated to about 50° C. before monomers were charged to the reactor. For each polymerization run, a total of approximately 2000 grams of monomers (butadiene and styrene) were used. Tetrahydrofuran was charged as a 20% solution in cyclohexane. The n-butyllithium was charged as a 2% solution in cyclohexane. After each addition of monomer, initiator or additive, the feed lines were rinsed with approximately 90 grams of cyclohexane solvent and cleared with a nitrogen sparge. After each charge of monomer or monomer mixture polymerization was allowed to continue to completion prior to the next addition of monomer or reagent. After the Styrene 1 charge had completely polymerized a sample was withdrawn from the reactor and coagulated in nitrogen-purged isopropyl alcohol to determine peak molecular weight by Gel Permeation Chromatography. In the polymerization step(s) in which both butadiene and styrene were charged, they were charged simultaneously.

In the coupling step, epoxidized soybean oil Vikoflex® 7170 from Atofina was charged as a 50% solution in cyclohexane. In the terminating step, water was added in an amount slightly in stoichiometric excess of the initiator to separate the lithium residues from the polymer chain. Carbon dioxide was also added at about 0.4 phm to the reactor from a pressurized cylinder.

The antioxidant mixture added in the stabilizing step contained a hindered phenol, Irganox 1010 a product of Ciba Specialty Chemicals, added at 0.2 phm and an organic phosphite, tris(nonylphenyl)phosphite available from GE Specialty Chemicals added at 0.5 phm.

Following the stabilization step, each copolymer solution was flashed at 178–180° C. to remove a portion of the solvent. Substantially all of the remaining solvent was removed in a vacuum oven by drying at 90° C. for one hour. The resulting polymer was chopped in a granulator into crumb size and then dried for an additional hour in a vacuum oven.

The recipes for the Example and Comparative Example copolymers are described in Table 1. Butadiene and styrene charges enclosed in parentheses are simultaneous charges that produce tapered butadiene/styrene blocks. Table 2 reports the recipes of the binary and ternary blends.

TABLE 1

Recipes for the Example and Comparative Example Copolymers

| | Example SBC # | | | | | | | | |
|---|---|---|---|---|---|---|---|---|---|
| | 1A | 1B | 1C | 1D | 1E | 1F | 1G | 1H | 1I |
| Tetrahydrofuran, phm | 0.04 | 0.04 | 0.04 | 0.04 | 0.04 | 0.04 | 0.04 | 0.04 | 0.04 |
| n-butyllithium 1, phm | 0.0825 | 0.0595 | 0.054 | 0.058 | 0.064 | 0.064 | 0.067 | 0.076 | 0.059 |
| Styrene 1, phm | 38 | 27 | 27 | 29 | 32 | 32 | 32 | 32 | 27 |
| n-butyllithium 2, phm | — | 0.0583 | 0.072 | 0.057 | 0.040 | 0.040 | 0.050 | 0.039 | 0.056 |
| Styrene 2, phm | — | 32 | 32 | 30 | 27 | 27 | 27 | 27 | 32 |
| (Butadiene 1, phm/ | 8 | 12 | 12 | 12 | 12 | 12 | 12 | 12 | 12 |
| Styrene 3, phm) | 13 | 9 | 9 | 9 | 9 | 9 | 9 | 9 | 9 |
| (Butadiene 2, phm/ | 8 | 11 | 11 | 11 | 11 | 11 | 11 | 11 | 11 |
| Styrene 4, phm) | 13 | 9 | 9 | 9 | 9 | 9 | 9 | 9 | 9 |
| (Butadiene 3, phm/ | 7 | — | — | — | — | — | — | — | — |
| Styrene 5, phm) | 13 | — | — | — | — | — | — | — | — |
| Coupling Agent, phm | 0.40 | 0.40 | 0.40 | 0.40 | 0.40 | 0.40 | 0.40 | 0.40 | 0.40 |
| Polystyrene 1, Mp | 35,600 | 30,500 | 33,000 | 34,500 | 33,200 | 34,300 | 32,600 | 29,200 | 31,600 |
| % Blocky S | 84.4 | 88.2 | 88.3 | 88.9 | 88.7 | 89.9 | 89.2 | 88.7 | 88.9 |
| PS Block MW 1 (calc) | 35,600 | 48,300 | 49,500 | 51,800 | 50,200 | 51,600 | 47,900 | 45,000 | 50,100 |
| PS Block MW 2 (calc) | 0 | 17,800 | 16,500 | 17,300 | 17,000 | 17,300 | 15,300 | 15,800 | 18,500 |

| | Example SBC # | | | | | | | | |
|---|---|---|---|---|---|---|---|---|---|
| | 1J | 1K | 1L | 1M | 1N | 1O | 1P | Comp. 2A | Comp. 2B |
| Tetrahydrofuran, phm | 0.04 | 0.04 | 0.04 | 0.04 | 0.10 | 0.10 | 0.10 | 0.10 | 0.10 |
| n-butyllithium 1, phm | 0.059 | 0.068 | 0.047 | 0.048 | 0.050 | 0.050 | 0.058 | 0.051 | 0.030 |
| Styrene 1, phm | 27 | 32 | 32 | 32 | 30 | 30 | 30 | 30 | 30 |
| n-butyllithium 2, phm | 0.050 | 0.043 | 0.059 | 0.070 | 0.055 | 0.055 | 0.047 | 0.060 | 0.080 |
| Styrene 2, phm | 32 | 27 | 27 | 27 | 20 | 20 | 20 | 20 | 20 |
| (Butadiene 1, phm/ | 12 | 12 | 12 | 12 | 7 | 7 | 7 | 5 | 7 |
| Styrene 3, phm) | 9 | 9 | 9 | 9 | 10 | 10 | 10 | 10 | 8 |
| (Butadiene 2, phm/ | 11 | 11 | 11 | 11 | 9 | 9 | 9 | 9 | 9 |
| Styrene 4, phm) | 9 | 9 | 9 | 9 | 8 | 8 | 8 | 11 | 11 |
| (Butadiene 3, phm/ | — | — | — | — | 11 | 12 | 12 | 10 | 10 |
| Styrene 5, phm) | — | — | — | — | 5 | 4 | 4 | 5 | 5 |
| Coupling Agent, phm | 0.40 | 0.40 | 0.40 | 0.40 | 0.40 | 0.40 | 0.40 | 0.40 | 0.40 |
| Polystyrene 1, Mp | 31,900 | 33,200 | 43,300 | 42,400 | 40,800 | 40,500 | 37,300 | 41,000 | 73,900 |
| % Blocky S | 88.9 | 89.7 | 88.9 | 90.0 | 81.3 | 82.0 | 81.6 | 83.5 | 82.3 |
| PS Block MW 1 (calc) | 51,600 | 49,700 | 59,600 | 57,000 | 53,300 | 53,000 | 50,300 | 53,000 | 86,000 |
| PS Block MW 2 (calc) | 19,700 | 16,500 | 16,300 | 14,600 | 12,500 | 12,500 | 13,000 | 12,000 | 12,100 |

| | Example SBC # | | | |
|---|---|---|---|---|
| | Comp. 3 | 4A | 4B | Comp. 5 |
| Tetrahydrofuran, phm | 0.04 | 0.04 | 0.04 | 0.04 |
| n-butyllithium 1, phm | 0.030 | 0.058 | 0.043 | 0.030 |
| Styrene 1, phm | 40 | 30 | 30 | 40 |
| n-butyllithium 2, phm | 0.037 | 0.038 | 0.038 | 0.039 |
| Styrene 2, phm | 20 | 24 | 24 | 14 |
| Butadiene 1, phm | 7.5 | | | |
| (Butadiene 1, phm/ | | 9 | 9 | 8.5 |
| Styrene 3, phm) | | 4 | 4 | 5 |
| n-butyllithium 3, phm | 0.10 | 0.064 | 0.081 | 0.090 |
| Styrene 3, phm | 15 | | | |
| Styrene 4, phm | | 14 | 14 | 14 |
| Butadiene 2, phm | 17.5 | 19 | 19 | 18.5 |
| Coupling Agent, phm | 0.40 | 0.40 | 0.40 | 0.40 |
| Polystyrene 1, Mp | 88,000 | 37,800 | 48,200 | 88,000 |
| % Blocky S | 97.7 | 95.1 | 95.0 | 95.1 |
| PS Block MW 1 (calc) | 107,400 | 55,100 | 67,900 | 101,200 |

TABLE 1-continued

Recipes for the Example and Comparative Example Copolymers

| | | | | |
|---|---|---|---|---|
| PS Block MW 2 (calc) | 19,400 | 17,300 | 19,700 | 13,200 |
| PS Block MW 3 (calc) | 5,800 | 5,900 | 5,600 | 5,700 |

TABLE 2

Binary and Ternary Examples and Comparative Examples

| Blend Sample # | Example SBC # | SBC content (% SBC) | Acrylate Copolymer Type | Acrylate Copolymer content (%) | SBR content (% SBR) |
|---|---|---|---|---|---|
| 1 | 1A | 55 | SBMA | 35 | 10 |
| 2 | 1B | 55 | SBMA | 35 | 10 |
| 3 | 1C | 55 | SBMA | 35 | 10 |
| 4 | 1D | 55 | SBMA | 35 | 10 |
| 5 | 1E | 55 | SBMA | 35 | 10 |
| 6 | 1F | 55 | SBMA | 35 | 10 |
| 7 | 1G | 55 | SBMA | 35 | 10 |
| 8 | 1H | 55 | SBMA | 35 | 10 |
| 9 | 1I | 55 | SBMA | 35 | 10 |
| 10 | 1J | 55 | SBMA | 35 | 10 |
| 11 | 1K | 60 | SBA | 40 | 0 |
| 12 | 1K | 70 | SBA | 30 | 0 |
| 13 | 1K | 70 | SBA | 30 | 0 |
| 14 | 1K | 50 | SBMA | 40 | 10 |
| 15 | 1L | 55 | SBMA | 35 | 10 |
| 16 | 1M | 55 | SBMA | 35 | 10 |
| 17 | 1N | 65 | SBMA | 35 | 0 |
| 18 | 1O | 65 | SBMA | 35 | 0 |
| 19 | 1P | 65 | SBMA | 35 | 0 |
| 20 | 4A | 65 | SBMA | 35 | 0 |
| 21 | 4B | 65 | SBMA | 35 | 0 |
| 22 | Comp. 2A | 55 | SBMA | 45 | 0 |
| 23 | Comp. 2A | 45 | SBMA | 55 | 0 |
| 24 | Comp. 2A | 35 | SBMA | 65 | 0 |
| 25 | Comp. 2A | 40 | SBMA | 55 | 5 |
| 26 | Comp. 2A | 35 | SBMA | 55 | 10 |
| 27 | Comp. 2A | 25 | SBMA | 65 | 10 |
| 28 | Comp. 3 | 70 | SBMA | 30 | 0 |
| 29 | Comp. 3 | 60 | SBMA | 40 | 0 |
| 30 | Comp. 3 | 50 | SBMA | 50 | 0 |
| 31 | Comp. 3 | 55 | SBMA | 40 | 5 |
| 32 | Comp. 3 | 50 | SBMA | 40 | 10 |
| 33 | Comp. 3 | 40 | SBMA | 50 | 10 |
| 34 | Comp. 5 | 65 | SBMA | 35 | 0 |
| 35 | Comp. 5 | 55 | SBMA | 45 | 0 |
| 36 | Comp. 5 | 45 | SBMA | 55 | 0 |
| 37 | Comp. 5 | 50 | SBMA | 45 | 5 |
| 38 | Comp. 5 | 45 | SBMA | 45 | 10 |
| 39 | Comp. 5 | 35 | SBMA | 55 | 10 |

SBA, Styrene-butyl acrylate copolymer;
SBMA, Styrene-butyl acrylate-methyl methacrylate copolymer Testing of the di- and triblends emphasized characterization of toughness, optical properties, and stiffness of sheet extruded from the various blends. The extruded sheet utilized in all the testing was 0.025" thick.

An indication of toughness was given by consideration of MTS Impact, Gardner Impact, and Tensile Break Strain (Table 3). An indication of optical clarity was given by consideration of % Haze, % Light Transmission, and % Clarity, with % Clarity having the best correlation to visual inspection of these blends (Table 4). An indication of color was given by consideration of Hunter "b" color, and Hunter "–b" color (Table 4). An indication of stiffness was given by Tensile Modulus (Table 3).

MTS Impact was a high speed puncture test, similar to that described by ASTM D3763. MTS Impact used hydraulic actuation of the tup to achieve an approximately constant speed. The sample was clamped in an aperture of 3" diameter and a tup with 1.5" diameter was driven through the sample at a controlled speed. The tup penetrated the sample at a speed of approximately 100 inches per second. Transducers recorded the forces experienced by the tup and its position as a function of time, allowing calculation of the total energy required for the tup to penetrate the sample. This "Total Energy" measurement can be used as one comparative measure of toughness.

Gardner Impact was a falling weight impact test. The Gardner Impact testing used in development of the comparative data complied with the requirements of ASTM D5420, using a striker diameter of 0.625" and an aperture ring diameter of 0.640". The Gardner Impact measurement can be used as one comparative measure of toughness.

Tensile Break Strain was a low speed test, measuring the amount of tensile elongation required to break the sample. The Tensile Break Strain testing used in development of the comparative data complied with the requirements of ASTM D638, using the Type IV specimen geometry and speed of 2 inches per minute. Elongation of the sheet sample was tested along the extrusion machine direction, abbreviated as "MD". Elongation was also tested along a direction 90 degrees from MD referred to as the transverse direction, abbreviated as "TD". Tensile Break Strain MD and Tensile Break Strain TD can be used as one comparative measure of toughness.

Tensile Modulus testing used in development of the comparative data complied with the requirements of ASTM D638, using the Type IV specimen geometry and speed of 2 inches per minute. This measurement can be used as one comparative measure of stiffness.

Measurements of Tensile Break Strength, Tensile Yield Strain, and Tensile Yield Strength complied with the requirements of ASTM D638, using the Type IV specimen geometry and speed of 2 inches per minute.

TABLE 3

Toughness and Stiffness of Examples and Comparative Examples

| Blend Sample # | MTS Impact (in · lb) | Gardner (in · lb) | MD Break Stress psi | MD Break Strain % | MD Yield Stress psi | MD Yield Strain % | MD Modulus ksi | TD Break Stress psi | TD Break Strain % | TD Yield Stress psi | TD Yield Strain % | TD Modulus ksi |
|---|---|---|---|---|---|---|---|---|---|---|---|---|
| 1 | 262.4 | 15.07 | 4944 | 347 | 3862 | 3.44 | 227.5 | 4623 | 352.4 | 2815 | 4.94 | 259.3 |
| 2 | 248.3 | 25.72 | 4739 | 359.2 | 3488 | 2.76 | 260.8 | 4416 | 380.1 | 2564 | 5.53 | 247.5 |
| 3 | 280.3 | 28.5 | 4868 | 375.3 | 3156 | 2.96 | 258.1 | 4435 | 369.6 | 2512 | 8.07 | 208.2 |
| 4 | 235.4 | 35.13 | 4511 | 336.7 | 3284 | 2.6 | 268.2 | 4311 | 330.5 | 2482 | 23.4 | 187.2 |
| 5 | 234.1 | 34.1 | 4778 | 330.2 | 3913 | 2.53 | 285.9 | 4306 | 364.2 | 2819 | 3.53 | 256 |
| 6 | 322.50 | 43.0 | 5129 | 225.9 | 4341 | 3.0 | 288.1 | 4298 | 342.6 | 3054 | 3.5 | 259.8 |
| 7 | 255.34 | 30.8 | 4878 | 285.2 | 3887 | 2.8 | 234.1 | 4652 | 382.0 | 2828 | 3.7 | 273.9 |
| 8 | 268.42 | 35.0 | 5055 | 247.2 | 4329 | 2.9 | 246.4 | 4264 | 350.0 | 3155 | 3.3 | 263.3 |
| 9 | 247.94 | 34.8 | 5037 | 282.1 | 4195 | 2.9 | 281.6 | 4566 | 383.5 | 3074 | 3.3 | 262.1 |
| 10 | 269.87 | 29.9 | 5088 | 239.8 | 4317 | 2.9 | 258.8 | 4452 | 362.1 | 3225 | 3.2 | 253.3 |
| 11 | 273.43 | 3.2 | 3822 | 136.1 | 5075 | 2.9 | 287.3 | 4168 | 264.2 | 3707 | 4.1 | 318.6 |
| 12 | 218.53 | 40.3 | 4646 | 321.7 | 4294 | 2.9 | 263.8 | 4362 | 375.2 | 3313 | 3.1 | 290.6 |
| 13 | 321.52 | 27.7 | 4307 | 261.8 | 4381 | 2.8 | 273.3 | 3830 | 310.7 | 3433 | 3.2 | 275.2 |
| 14 | 169.37 | 22.1 | 4109 | 299.9 | 4011 | 2.3 | 280.5 | 4355 | 376.5 | 2747 | 15.6 | 288.8 |
| 15 | 192.18 | 25.4 | 4780 | 325.0 | 3613 | 2.4 | 239.0 | 4613 | 353.3 | NY | NY | 148.2 |
| 16 | 193.70 | 24.9 | 5036 | 328.5 | 3439 | 2.5 | 217.4 | 4541 | 360.8 | 2596 | 7.9 | 204.3 |
| 22 | 224.2 | — | 4267 | 254.5 | 3333 | 16.58 | 211.7 | 4389 | 281.4 | — | — | 108 |
| 23 | 164.9 | — | 3674 | 116.7 | 4624 | 3.62 | 279.5 | 4521 | 248.6 | 3583 | 18.74 | 173.6 |
| 26 | 207.8 | | 3576 | 127.3 | 4669 | 3.3 | 295.2 | 4115 | 239.8 | 3518 | 66.1 | 169.7 |
| 28 | 305.9 | | 3829 | 247.3 | 3694 | 2.05 | 311.8 | 4010 | 277.2 | 2657 | 19.69 | 132.3 |
| 29 | 208.2 | | 3588 | 214 | 4235 | 2.27 | 306.4 | 3962 | 264.2 | 2952 | 15.84 | 136.9 |
| 31 | 279 | | 3735 | 239.9 | 3690 | 2.29 | 296.3 | 4153 | 280.1 | 2959 | 14.74 | 130.9 |
| 35 | 236.9 | | 4222 | 252.5 | 4126 | 2.5 | 295.1 | 4022 | 262.3 | 3033 | 15.17 | 177.8 |

—, not measured.
NY, no yield under testing conditions

The visual properties % Haze, % Light Transmission, and % Clarity were measured using a BYK Gardner Haze-Gard Plus instrument. Measurements were made in accordance with operating instructions of this instrument. These three measurements can be used as one comparative measurement of clarity.

Color measurements of Hunter "b" and Hunter "–b" were obtained from a Hunter Lab LabScan XE instrument, model #LSXE, using illuminant C and an observer angle of 2 degrees. Hunter "–b" was measured using a black background for the sample. Measurements were made in accordance with operating instructions of this instrument. These measurements can be used as one comparative measurement of color.

TABLE 4

Clarity and Color of Examples and Comparative Examples

| Blend Sample # | Blueness (Hunter –b) | Haze (%) | Clarity (%) | Color (Hunter b) | Light Trans % |
|---|---|---|---|---|---|
| 1 | –6.52 | 3.3 | 94.3 | 1.44 | 92.1 |
| 2 | –2.18 | 2.92 | 86.4 | 0.92 | 93.2 |
| 3 | –2.12 | 4.02 | 86.6 | 0.87 | 93.6 |
| 4 | –1.79 | 5.19 | 86.9 | 0.88 | 93.4 |
| 5 | –1.76 | 3.8 | 93.8 | 0.88 | 93.4 |
| 6 | –0.55 | 3.06 | 89.7 | 0.9 | 91.6 |
| 7 | –1.54 | 3.48 | 87.3 | 0.9 | 92.0 |
| 8 | –1.80 | 5.63 | 77.2 | 0.9 | 91.5 |
| 9 | –1.80 | 5.07 | 78.2 | 0.9 | 91.5 |
| 10 | –1.75 | 3.30 | 89.0 | 0.9 | 92.2 |
| 11 | –2.47 | 1.63 | 95.3 | 1.0 | 92.5 |
| 12 | –2.49 | 2.11 | 97.7 | 1.0 | 92.9 |
| 13 | –0.99 | 1.48 | 97.9 | 0.7 | 93.5 |
| 14 | –1.77 | 1.78 | 95.3 | 1.0 | 93.0 |
| 15 | –1.61 | 2.14 | 93.4 | 0.9 | 92.5 |
| 16 | –1.52 | 2.26 | 90.8 | 0.8 | 92.8 |
| 17 | –2.41 | 2.37 | 88.4 | — | — |
| 18 | –3.51 | 2.19 | 90.2 | — | — |
| 19 | –2.93 | 1.86 | 90.3 | — | — |
| 20 | –2.77 | 2.53 | 86.2 | — | — |
| 21 | –3.04 | 2.7 | 87.4 | — | — |
| 22 | –2.8 | 4.7 | 79.8 | 0.13 | 93.5 |
| 23 | –2.55 | 3.74 | 84.4 | 0.08 | 93.5 |
| 24 | –2.02 | 3.67 | 88.2 | 0.04 | 93.6 |
| 25 | –4.79 | 3.4 | 81.6 | 0.38 | 93.6 |
| 26 | –6.11 | 3.9 | 88.7 | 0.46 | 93.3 |
| 27 | –10.26 | 6.86 | 73.3 | 0.44 | 90.5 |
| 28 | –2.31 | 5.2 | 84.1 | –0.01 | 94.1 |
| 29 | –2.44 | 4.87 | 83.8 | –0.02 | 94.1 |
| 30 | –2.44 | 3.91 | 90.5 | 0.04 | 93.9 |
| 31 | –4.65 | 3.97 | 82.7 | 0.19 | 93.5 |
| 32 | –5.81 | 4.94 | 79.8 | 0.29 | 92.9 |
| 33 | –7.98 | 7 | 75 | 0.38 | 91.9 |
| 34 | –3.43 | 4.06 | 80 | 0.29 | 93.8 |
| 35 | –3.6 | 3.64 | 78.6 | 0.12 | 94.1 |
| 36 | –3.76 | 4.78 | 83.8 | 0.13 | 94 |
| 37 | –5.8 | 6.18 | 78 | 0.5 | 93.1 |
| 38 | –7.49 | 5.74 | 76.4 | 0.42 | 92.4 |
| 39 | –10.84 | 7.71 | 73.8 | 0.35 | 90.5 |

EXAMPLE 6

Shrink sleeve label materials comprising Chevron Phillips K-Resin® were tested on either a lab scale line which ran a continuous sheet of film which was stretched to varying degrees or on a pilot scale batch process in which individual samples were stretched in one or both directions to the desired length. In comparison to the state of the art, PETG is known to have high shrinkage at temperatures below 100° C.

One exemplary test focused on 50/50 blends by weight parts of (i) a styrene-butadiene copolymer (K-Resin®

DK11) or (ii) a styrene-butadiene tapered copolymer (K-Resin® DK13) with (a) styrene-butyl acrylate copolymer containing 10–17.5 wt % butyl acrylate (SBA-a) or (b) styrene-butyl acrylate copolymer containing 17.5–25 wt % butyl acrylate (SBA-b). Five stretching temperatures (75° C., 80° C., 85° C., 90° C., and 95° C.); two stretch ratios (4:1 and 5:1); and two stretch rates (50% per second and 25% per second) were tested. Table 5 summarizes the maximum shrinkage values obtained:

TABLE 5

| Material | Maximum Shrinkage Attained at 100° C. | | Maximum Shrinkage Occurred | | |
|---|---|---|---|---|---|
| | Test 1 | Test 2 | Stretch Temp (° C.) | Stretch Ratio | Stretch Rate (%/sec) |
| PETG | 65% | 65% | 85 | 5:1 | 50 |
| DK11 | 25% | 25% | 95 | 5:1 | 50 |
| DK11 w/50% SBA-a | 33% | 33% | 85 | 5:1 | 50 |
| DK11 w/50% SBA-b | 63% | 62% | 95 | 4:1 | 25 |
| DK13 | 63% | 62% | 85 | 5:1 | 50 |
| DK13 w/50% SBA-a | 50% | 35% | 80 | 5:1 | 25 |
| DK13 w/50% SBA-b | 60% | 68% | 75 | 5:1 | 50 |

As shown in Table 5, 50/50 blends by weight parts of DK11 or DK13 with SBA-b were roughly comparable in shrink properties to PETG.

Figure 4:
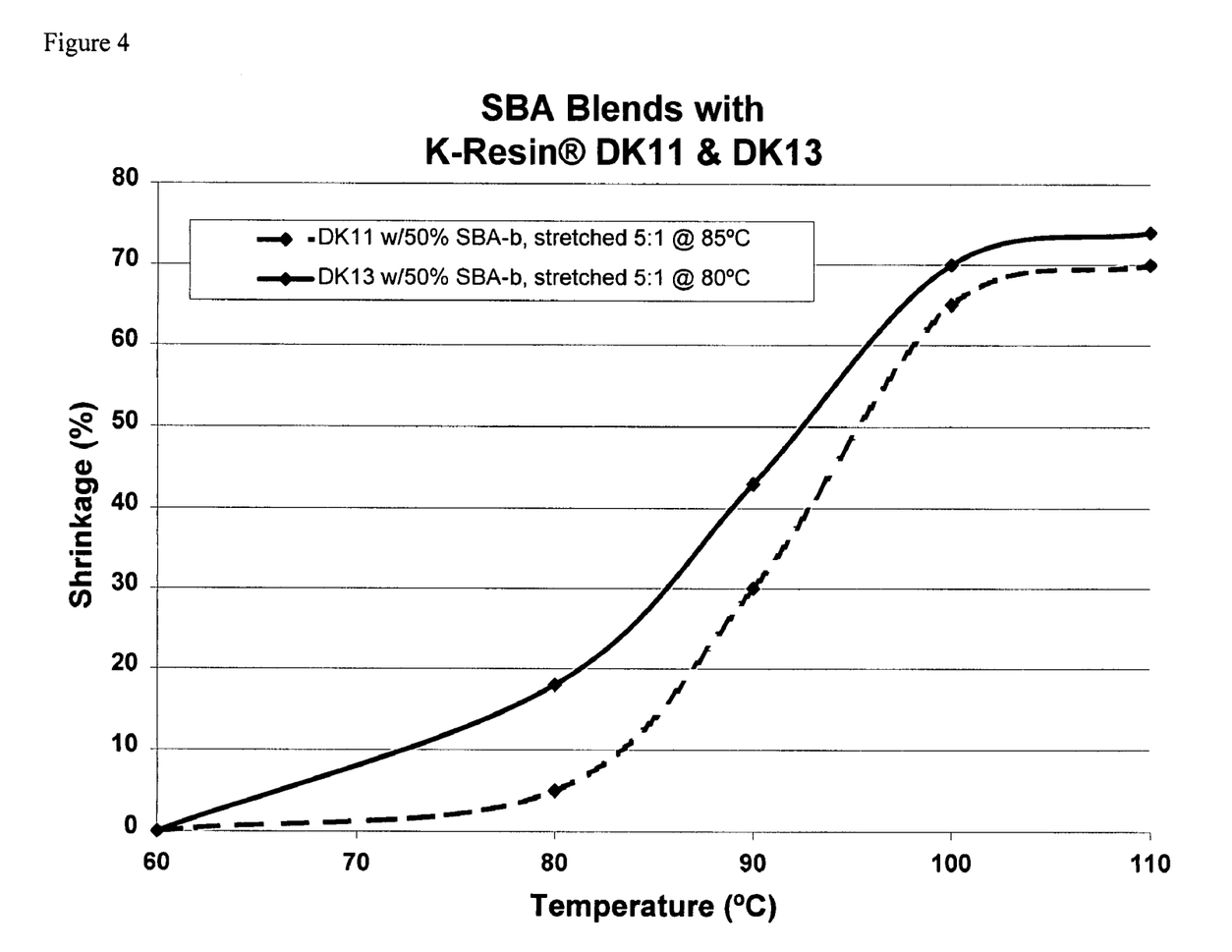
FIG. 4 shows shrinkage as a function of temperature for blends described in Example 6.

FIG. 4 compares blends containing DK11 and blends containing DK13. DK13 exhibited lower shrink initiation and maximum shrinkage at or below 100° C.

Figure 5:
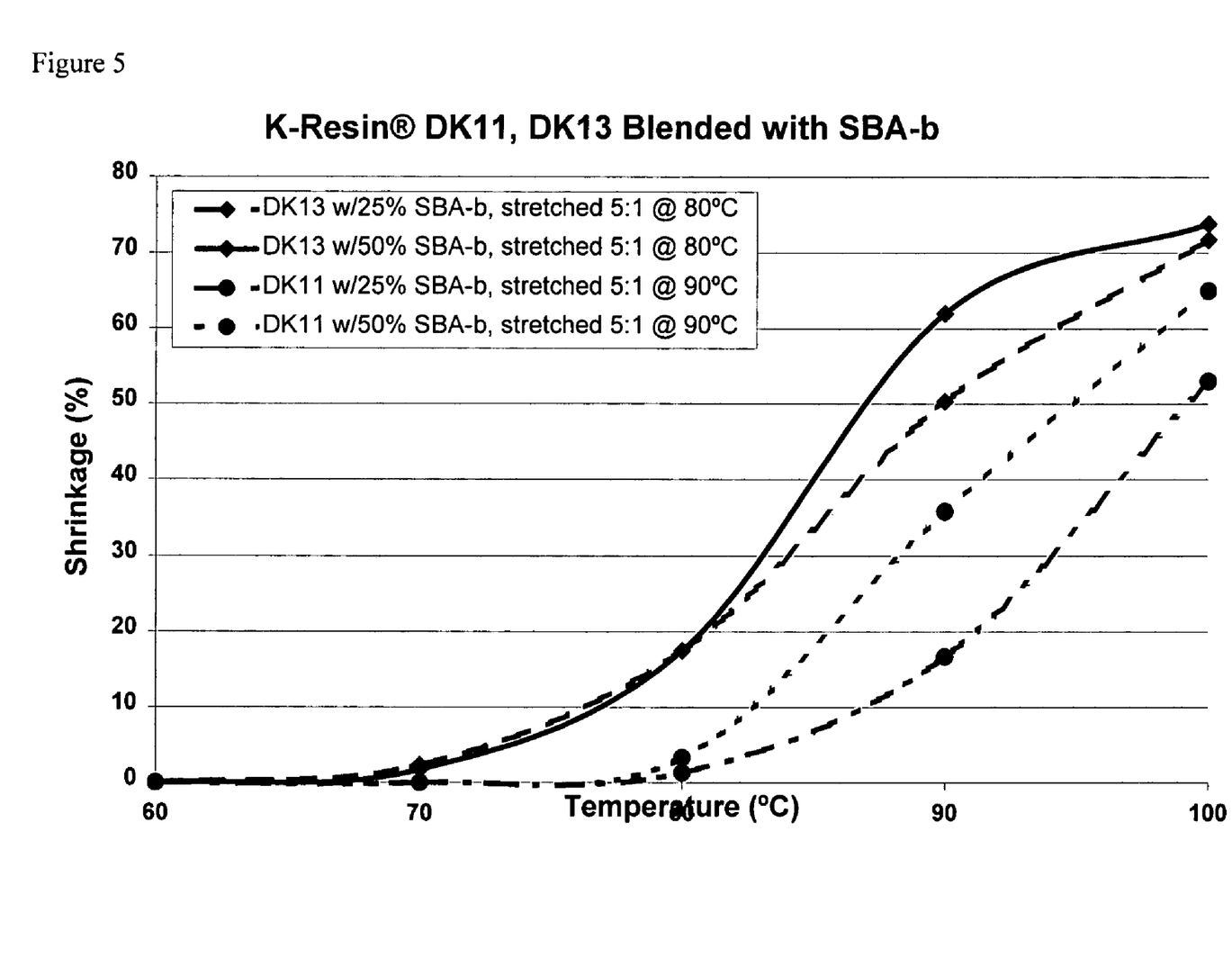
FIG. 5 shows shrinkage as a function of temperature for other blends described in Example 6.

FIG. 5 provides a further comparison between DK11 and DK13 blends, and also shows the effect of SBA level and shrinkage.

Figure 6:
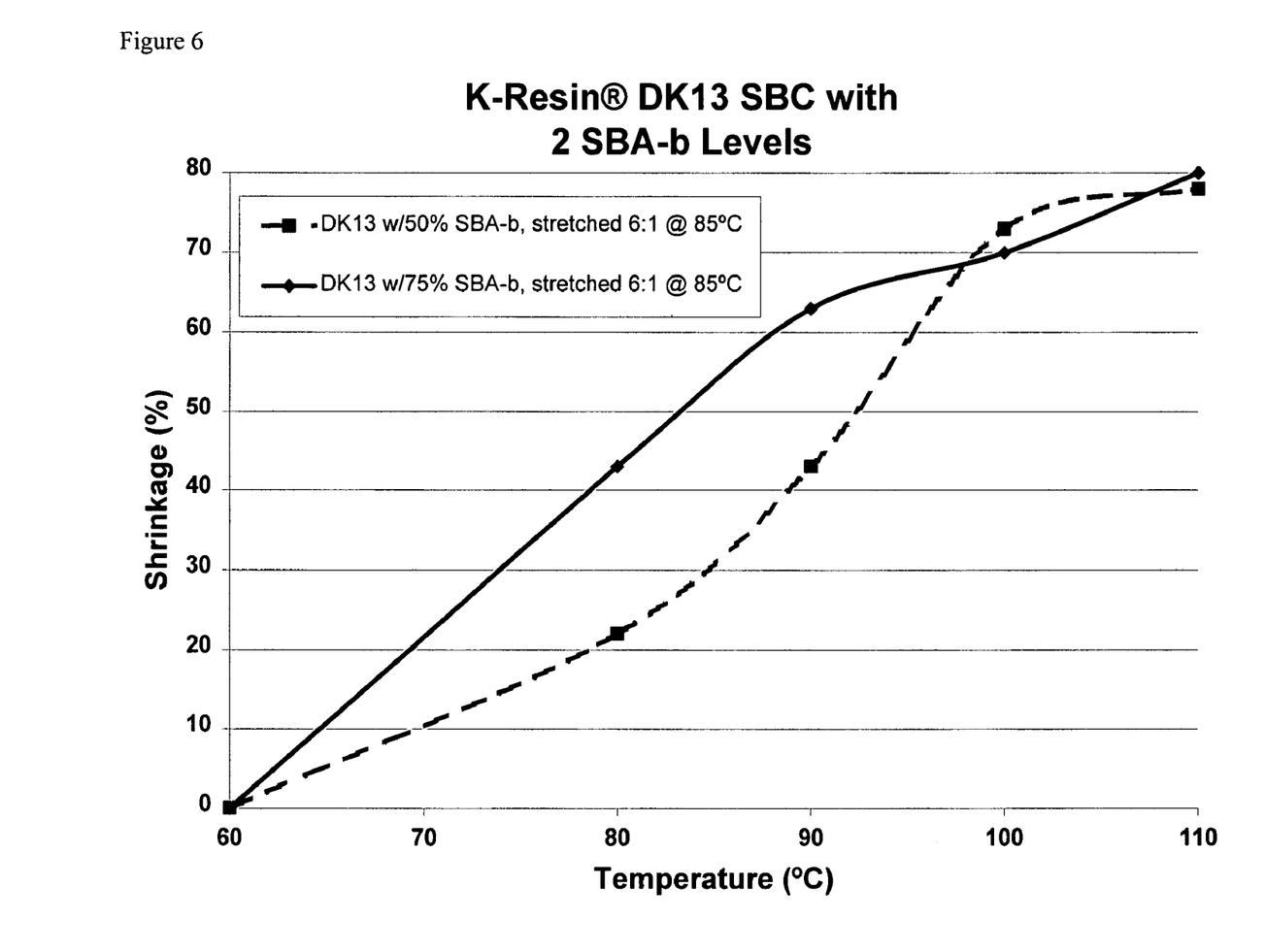
FIG. 6 shows shrinkage as a function of temperature for additional blends described in Example 6.

FIG. 6 shows the effect of SBA level in a blend with DK13.

All of the compositions and articles disclosed and claimed herein can be made and executed without undue experimentation in light of the present disclosure. While the compositions of this invention have been described in terms of particular embodiments, it will be apparent to those of skill in the art that variations may be applied to the compositions and articles described herein without departing from the concept, spirit and scope of the invention. All such variations apparent to those skilled in the art are deemed to be within the spirit, scope and concept of the invention as defined by the appended claims.

What is claimed is:

1. A composition, comprising:
   (i) from about 25 parts by weight to about 95 parts by weight of a monovinylarene-conjugated diene coupled block copolymer comprising at least one tapered block, having a blocky monovinylarene content of less than 90 wt % of total monovinylarene units, and comprising a terminal monovinylarene block having a molecular weight of less than 60,000 g/mol;
   (ii) from about 5 parts by weight to about 75 parts by weight of a monovinylarene-alkyl (meth)acrylate copolymer, comprising (ii-a) monovinylarene units and (ii-b) at least one of ethyl acrylate units, propyl acrylate units, butyl acrylate units, pentyl acrylate units, or hexyl acrylate units; and
   (iii) about 0.1 parts by weight to about 20 parts by weight of a macromolecular compound wherein all materials copolymerized in said macromolecular compound result in a monovinylarene-conjugated diene rubber.

2. The composition of claim 1, comprising from about 30 parts by weight to about 80 parts by weight of the monovinylarene-conjugated diene block copolymer.

3. The composition of claim 1, wherein the monovinylarene-conjugated diene block copolymer comprises from about 20 wt % to about 30 wt % conjugated diene units.

4. The composition of claim 1, wherein the monovinylarene-conjugated diene block copolymer comprises two or three tapered blocks.

5. The composition of claim 1, wherein in the monovinylarene-conjugated diene block copolymer, the monovinylarene units are styrene units and the conjugated diene units are butadiene units.

6. The composition of claim 1, comprising from about 10 parts by weight to about 70 parts by weight of the monovinylarene-alkyl (meth)acrylate copolymer.

7. The composition of claim 6, comprising from about 10 parts by weight to about 30 parts by weight of the monovinylarene-alkyl (meth)acrylate copolymer.

8. The composition of claim 6, comprising from about 24 parts by weight to about 65 parts by weight of the monovinylarene-alkyl (meth)acrylate copolymer.

9. The composition of claim 1, wherein the monovinylarene-alkyl (meth)acrylate copolymer comprises methyl acrylate units, ethyl acrylate units, propyl acrylate units, butyl acrylate units, pentyl acrylate units, or hexyl acrylate units.

10. The composition of claim 9, wherein the monovinylarene-alkyl (meth)acrylate copolymer comprises from about 10 wt % to about 25 wt % butyl acrylate units.

11. The composition of claim 10, wherein the monovinylarene-alkyl (meth)acrylate copolymer comprises (i) from about 10 wt % to about 17.5 wt % butyl acrylate units or (ii) from about 17.5 wt % to about 25 wt % butyl acrylate units.

12. The composition of claim 1, wherein the monovinylarene-alkyl (meth)acrylate copolymer comprises methyl methacrylate units, ethyl methacrylate units, propyl methacrylate units, butyl methacrylate units, pentyl methacrylate units, or hexyl methacrylate units.

13. The composition of claim 12, wherein the monovinylarene-alkyl (meth)acrylate copolymer comprises from about 3 wt % to about 10 wt % methyl methacrylate units.

14. The composition of claim 13, wherein the monovinylarene-alkyl (meth)acrylate copolymer comprises from about 10 wt % to about 15 wt % butyl acrylate units, and the butyl acrylate units and the methyl methacrylate units together comprise from about 10 wt % to about 25 wt % of the monovinylarene-alkyl (meth)acrylate copolymer.

15. The composition of claim 1, wherein in the monovinylarene-alkyl (meth)acrylate copolymer, the monovinylarene units are styrene units.

16. The composition of claim 1, comprising from about 1 part by weight to about 20 parts by weight of the monovinylarene-conjugated diene rubber.

17. The composition of claim 1, comprising from about 0.1 part by weight to about 10 parts by weight of the monovinylarene-conjugated diene rubber.

18. The composition of claim 17, comprising from about 1 part by weight to about 10 parts by weight of the monovinylarene-conjugated diene rubber.

19. The composition of claim 1, wherein the monovinylarene-conjugated diene rubber comprises less than about 50 wt % monovinylarene units.

20. The composition of claim 1, wherein in the monovinylarene-conjugated diene rubber, the monovinylarene units are styrene units and the conjugated diene units are butadiene units or isoprene units.

21. A film, comprising:
a layer comprising:
a composition comprising:
(i) from about 25 parts by weight to about 95 parts by weight of a monovinylarene-conjugated diene coupled block copolymer comprising at least one tapered block, having a blocky monovinylarene content of less than 90 wt % of total monovinylarene units, and comprising a terminal monovinylarene block having a molecular weight of less than 60,000 g/mol;
(ii) from about 5 parts by weight to about 75 parts by weight of a monovinylarene-alkyl (meth)acrylate copolymer, comprising (ii-a) monovinylarene units and (ii-b) at least one of ethyl acrylate units, propyl acrylate units, butyl acrylate units, pentyl acrylate units, or hexyl acrylate units; and
(iii) about 0.1 parts by weight to about 20 parts by weight of a macromolecular compound wherein all materials copolymerized in said macromolecular compound result in a monovinylarene-conjugated diene rubber.

22. The film of claim 21, wherein the film has been oriented in at least one direction.

23. The film of claim 22, wherein the film has been oriented in two directions.

24. The film of claim 22, wherein the monovinylarene-conjugated diene block copolymer comprises from about 20 wt % to about 30 wt % conjugated diene units.

25. The film of claim 22, wherein the monovinylarene-conjugated diene block copolymer comprises two or three tapered blocks.

26. The film of claim 22, wherein in the monovinylarene-conjugated diene block copolymer, the monovinylarene units are styrene units and the conjugated diene units are butadiene units.

27. The film of claim 21, wherein the monovinylarene-alkyl (meth)acrylate copolymer comprises from about 10 wt % to about 25 wt % butyl acrylate units.

28. The film of claim 27, wherein the monovinylarene-alkyl (meth)acrylate copolymer comprises (i) from about 10 wt % to about 17.5 wt % butyl acrylate units or (ii) from about 17.5 wt % to about 25 wt % butyl acrylate units.

29. The film of claim 21, wherein in the monovinylarene-alkyl (meth)acrylate copolymer, the monovinylarene units are styrene units and the alkyl (meth)acrylate units are butyl acrylate units.

30. The film of claim 1, comprising from about 0.1 parts by weight to about 10 parts by weight of the monovinylarene-conjugated diene rubber.

31. A method of applying a label to a container, comprising:
shrinking (a) a shrink film, comprising a layer, comprising a composition comprising (i) from about 25 parts by weight to about 95 parts by weight of a monovinylarene-conjugated diene coupled block copolymer comprising at least one tapered block, having a blocky monovinylarene content of less than 90 wt % of total monovinylarene units, and comprising a terminal monovinylarene block having a molecular weight of less than 60,000 g/mol; (ii) from about 5 parts by weight to about 75 parts by weight of a monovinylarene-alkyl (meth)acrylate copolymer, comprising (ii-a) monovinylarene units and (ii-b) at least one of ethyl acrylate units, propyl acrylate units, butyl acrylate units, pentyl acrylate units, or hexyl acrylate units; and
(iii) about 0.1 parts by weight to about 20 parts by weight of a macromolecular compound wherein all materials copolymerized in said macromolecular compound result in a monovinylarene-conjugated diene rubber, to (b) at least a portion of the exterior surface of a container structure.

32. The method of claim 31, wherein the shrinking step comprises exposing the shrink film and the portion of the exterior surface of the container structure to a temperature less than about 150° C.

33. A packaging article, comprising:
a layer comprising:
a composition comprising:
(i) from about 25 parts by weight to about 95 parts by weight of a monovinylarene-conjugated diene coupled block copolymer comprising at least one tapered block, having a blocky monovinylarene content of less than 90 wt % of total monovinylarene units, and comprising a terminal monovinylarene block having a molecular weight of less than 60,000 g/mol;
(ii) from about 5 parts by weight to about 75 parts by weight of a monovinylarene-alkyl (meth)acrylate copolymer, comprising (ii-a) monovinylarene units and (ii-b) at least one of ethyl acrylate units, propyl acrylate units, butyl acrylate units, pentyl acrylate units, or hexyl acrylate units; and
(iii) about 0.1 parts by weight to about 20 parts by weight of a macromolecular compound wherein all materials copolymerized in said macromolecular compound result in a monovinylarene-conjugated diene rubber.

34. The packaging article of claim 33, wherein the monovinylarene-conjugated diene block copolymer comprises two tapered blocks.

35. The packaging article of claim 33, wherein the packaging article is in the form of a thermoformed package.

36. The packaging article of claim 35, wherein the thermoformed package is a clamshell package, a blister pack, or a thermoformed tray.

37. A method of packaging a product, comprising:
forming a layer, comprising a composition, comprising (i) from about 25 parts by weight to about 95 parts by weight of a monovinylarene-conjugated diene coupled block copolymer comprising at least one tapered block, having a blocky monovinylarene content of less than 90 wt % of total monovinylarene units, and comprising a terminal monovinylarene block having a molecular weight of less than 60,000 g/mol; (ii) from about 5 parts by weight to about 75 parts by weight of a monoviny-larene-alkyl (meth)acrylate copolymer, comprising (ii-a) monovinylarene units and (ii-b) at least one of ethyl acrylate units, propyl acrylate units, butyl acrylate units, pentyl acrylate units, or hexyl acrylate units; and (iii) about 0.1 parts by weight to about 20 parts by weight of a monovinylarene-conjugated diene rubber into a packaging article structured to receive the product; and
sealing the product into the packaging article.

* * * * *

UNITED STATES PATENT AND TRADEMARK OFFICE
CERTIFICATE OF CORRECTION

PATENT NO. : 7,193,014 B2 Page 1 of 1
APPLICATION NO. : 10/784143
DATED : March 20, 2007
INVENTOR(S) : John D. Wilkey et al.

It is certified that error appears in the above-identified patent and that said Letters Patent is hereby corrected as shown below:

In column 23, line 25, delete "claim 22" and insert -- claim 21 -- .

In column 23, line 28, delete "claim 22" and insert -- claim 21 -- .

In column 23, line 31, delete "claim 22" and insert -- claim 21 -- .

Signed and Sealed this

Eighth Day of May, 2007

JON W. DUDAS
*Director of the United States Patent and Trademark Office*